United States Patent
Krishnan et al.

(10) Patent No.: US 12,511,590 B2
(45) Date of Patent: Dec. 30, 2025

(54) FIELD PROGRAMMABLE GATE ARRAY (FPGA) BASED ONLINE 3D BIN PACKING

(71) Applicant: Tata Consultancy Services Limited, Mumbai (IN)

(72) Inventors: Ashwin Krishnan, Thane West (IN); Harshad Khadilkar, Thane West (IN); Rekha Singhal, Thane West (IN); Ansuma Basumatary, Kolkata (IN); Manoj Karunakaran Nambiar, Thane West (IN); Arijit Mukherjee, Kolkata (IN); Kavya Borra, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 389 days.

(21) Appl. No.: 18/456,251

(22) Filed: Aug. 25, 2023

(65) Prior Publication Data
US 2024/0112095 A1    Apr. 4, 2024

(30) Foreign Application Priority Data
Sep. 29, 2022    (IN) .............................. 202221056012

(51) Int. Cl.
*G06Q 10/04*    (2023.01)
(52) U.S. Cl.
CPC .................................... *G06Q 10/04* (2013.01)
(58) Field of Classification Search
CPC .... G06Q 10/04; G06Q 10/083; G06F 30/331; G06F 30/34; G06F 2113/20; G06F 30/17; G06F 30/27; G06F 30/10; G06N 3/045
See application file for complete search history.

(56) References Cited

U.S. PATENT DOCUMENTS

2023/0267404 A1\*    8/2023    Villalobos ............ B65D 88/745
                                                               705/332

FOREIGN PATENT DOCUMENTS

| CN | 111860837 A | \* | 10/2020 | ............... G06N 3/08 |
| CN | 112533834 B | \* | 4/2022  | ............... B65B 5/10 |
| EP | 3862939 A1  |    | 8/2021  |                           |

OTHER PUBLICATIONS

Kroes, Mairin et al., "Evolutionary Bin Packing for Memory-Efficient Dataflow Inference Acceleration on FPGA", Title of the item: GECCO 2020 Proceedings, Date: Mar. 24, 2020, Publisher: arxiv, Link: https://arxiv.org/pdf/2003.12449.pdf.

(Continued)

*Primary Examiner* — Chad G Erdman
(74) *Attorney, Agent, or Firm* — Finnegan, Henderson, Farabow, Garrett & Dunner, LLP

(57) ABSTRACT

The disclosure generally relates to an FPGA-based online 3D bin packing. Online 3D bin packing is the process of packing boxes into larger bins-Long Distance Containers (LDCs) such that the space inside each LDC is used to the maximum extent. The use of deep reinforcement learning (Deep RL) for this process is effective and popular. However, since the existing processor-based implementations are limited by Von-Neumann architecture and take a long time to evaluate each alignment for a box, only a few potential alignments are considered, resulting in sub-optimal packing efficiency. This disclosure describes an architecture for bin packing which leverages pipelining and parallel processing on FPGA for faster and exhaustive evaluation of all alignments for each box resulting in increased efficiency. In addition, a suitable generic purpose processor is employed to train the neural network within the algorithm to make the disclosed techniques computationally light, faster and efficient.

15 Claims, 10 Drawing Sheets

(56) References Cited

OTHER PUBLICATIONS

Liu, Xu et al., "A Hybrid GPU-FPGA-based Computing Platform for Machine Learning", Title of the item: Procedia Computer Science, Date: Nov. 5, 2018, pp. 104-111, vol. issue Nos. vol. 141, Publisher: ScienceDirect, Link: https://www.sciencedirect.com/science/article/pii/S1877050918318052.

He, Xin et al., "Enabling Energy-Efficient DNN Training on Hybrid GPU-FPGA Accelerators", Title of the item : ICS '21: Proceedings of the ACM International Conference on Supercomputing, Date: Jun. 4, 2021, pp. 227-241, Publisher: ACM, Inc., Link: http://pasalabs.org/papers/2021/ICS21_hype_training.pdf.

* cited by examiner receiving a plurality of inputs from a plurality of sources, wherein the plurality of inputs is associated with a plurality of boxes, and a Long-Distance Container (LDC) in which the plurality of boxes is to be packed, wherein the plurality of inputs comprises : — 302 a plurality of box dimensions for each of the plurality of boxes from the plurality of boxes, represented by a length (l), a breadth (b) and a height (h)

a plurality of co-ordinates within the LDC a 2D-Array representation of the LDC where each element of the 2D array comprises a value equivalent to the height(h) of the plurality of boxes packed at a co-ordinate from the plurality of co-ordinates

FIELD PROGRAMMABLE GATE ARRAY (FPGA) BASED ONLINE 3D BIN PACKING

PRIORITY CLAIM

This U.S. patent application claims priority under 35 U.S.C. § 119 to: India Application No. 202221056012, filed on Sep. 29, 2022. The entire contents of the aforementioned application are incorporated herein by reference.

TECHNICAL FIELD

The disclosure herein generally relates to online 3-Dimensional (3D) bin packing, and, more particularly, a method and a system for FPGA based online 3D bin packing.

BACKGROUND

The 3D bin packing is a process of packing boxes or parcels into larger bins (called Long Distance Containers or LDCs) such that the space inside each LDC is used to the maximum extent. The online automated 3D bin packing is a real-time scenario in which each box must be assessed and placed on the go by a robot, unlike offline bin packing, where the characteristics of the entire set of boxes to be packed are known a priori.

Traditionally, a 3D bin packing problem is solved using heuristic approaches. Challenge with the heuristic approaches is the design effort required to obtain good quality solutions, and the fact that different size distributions require manual tuning of the parameters. Alternatives including meta-heuristics and formal optimization techniques for solving 3D bin packing problem are difficult to scale to large problems, especially in the online setting.

In recent years, the use of deep reinforcement learning (Deep RL) for solving online 3D Bin Packing is gaining popularity, however, training for deep RL involves heavy iterative computation. The existing CPU implementations are limited by Von Neumann architecture and cannot optimize the operations involved in deep RL based bin packing which has a dataflow architecture. Further, the deep RL offers scope for parallel as well as pipelined processing, which can be leveraged to make the online 3D bin packing faster and more efficient. Hence there is a need for an approach that can support parallel and pipelined implementation of the dataflow architecture required for online 3D bin packing.

SUMMARY

Embodiments of the present disclosure present technological improvements as solutions to one or more of the above-mentioned technical problems recognized by the inventors in conventional systems. For example, in one embodiment, a method for FPGA based online 3D bin packing is provided.

The system includes a memory storing instructions, one or more communication interfaces, and one or more hardware processors coupled to the memory via the one or more communication interfaces, wherein the one or more hardware processors are configured by the instructions to receive a plurality of inputs from a plurality of sources, wherein the plurality of inputs is associated with a plurality of boxes, and a Long-Distance Container (LDC) in which the plurality of boxes is to be packed. The system is configured to identify a list of feasible alignments for a box in the LDC, by iterating through the plurality of coordinates, via the one or more hardware processors, wherein the list of feasible alignments is a list of coordinates within the LDC where the box can be placed, where the iteration comprising; performing a dimension eligibility check for a coordinate from the plurality of coordinates based on a parallel processing technique, perform a surface eligibility check and a physical stability check for the coordinate based on a parallel comparator technique. The system is further configured to determine a set of features for each feasible alignment from the list of feasible alignments based on a set of parallel processing technique, wherein the set of features comprises a LDC state, a border state and an aggregate state. The system is further configured to identify a final alignment for the box within the LDC, based on the set of features and the list of feasible alignments using a pre-trained DQN inference layer wherein the pre-trained DQN inference layer is pre-trained using a generic purpose processor.

In another aspect, a method for FPGA based online 3D bin packing is provided. The method includes receiving a plurality of inputs from a plurality of sources, wherein the plurality of inputs is associated with a plurality of boxes, and a Long-Distance Container (LDC) in which the plurality of boxes is to be packed. The method further includes identification of a list of feasible alignments for a box in the LDC, by iterating through the plurality of coordinates, wherein the list of feasible alignments is a list of coordinates within the LDC where the box can be placed, where the iteration comprising; performing a dimension eligibility check for a coordinate from the plurality of coordinates based on a parallel processing technique, performing a surface eligibility check and a physical stability check for the coordinate based on a parallel comparator technique. The method further includes determining a set of features for each feasible alignment from the list of feasible alignments based on a set of parallel processing technique, wherein the set of features comprises a LDC state, a border state and an aggregate state. The method further includes identification of a final alignment for the box within the LDC, based on the set of features and the list of feasible alignments using a pre-trained DQN inference layer wherein the pre-trained DQN inference layer is pre-trained using a generic purpose processor.

In yet another aspect, a non-transitory computer readable medium for FPGA based online 3D bin packing is provided. The program includes receiving a plurality of inputs from a plurality of sources, wherein the plurality of inputs is associated with a plurality of boxes, and a Long-Distance Container (LDC) in which the plurality of boxes is to be packed. The program further includes identification of a list of feasible alignments for a box in the LDC, by iterating through the plurality of coordinates, wherein the list of feasible alignments is a list of coordinates within the LDC where the box can be placed, where the iteration comprising; performing a dimension eligibility check for a coordinate from the plurality of coordinates based on a parallel processing technique, performing a surface eligibility check and a physical stability check for the coordinate based on a parallel comparator technique. The program further includes determining a set of features for each feasible alignment from the list of feasible alignments based on a set of parallel processing technique, wherein the set of features comprises a LDC state, a border state and an aggregate state. The program further includes identification of a final alignment for the box within the LDC, based on the set of features and the list of feasible alignments using a pre-trained DQN inference layer wherein the pre-trained DQN inference layer is pre-trained using a generic purpose processor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B is a flow diagram illustrating a method (300) for FPGA based online 3D bin packing, by the system of FIG. 1, in accordance with some embodiments of the present disclosure.

DETAILED DESCRIPTION

Figure 1:
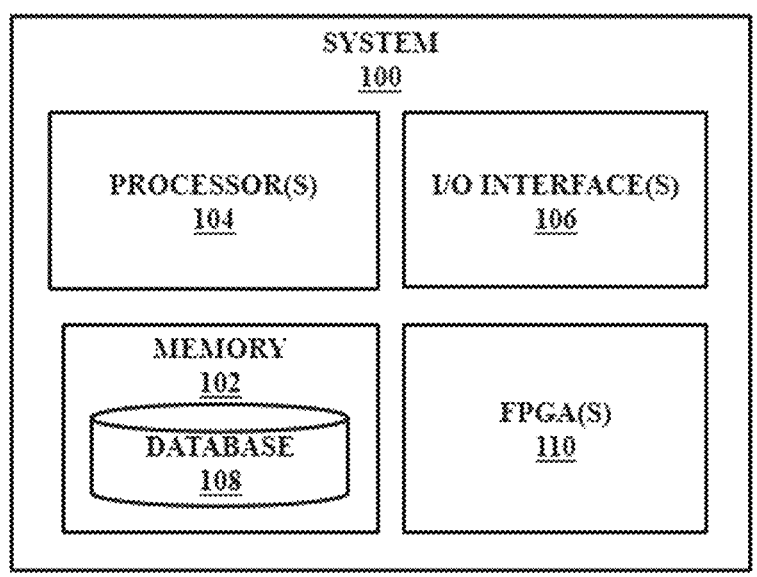
FIG. 1 illustrates an exemplary system for FPGA based online 3D bin packing, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The Indian patent application "IN202021005053" titled "System and method for autonomous multi-bin parcel loading system" disclosed an autonomous multi-bin parcel loading system that handles an online object packing in which information on dimensions of objects to be loaded is not available in advance. The Indian patent application evaluates multiple alignments to pack each box, however evaluating each alignment takes a long time to evaluate on generic processors. Hence, only a few alignments are shortlisted, thus resulting in selection of an alignment that might not be the best one possible. Further training the DQN within the bin packing algorithm is complex & requires large computation space.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 is a functional block diagram of a system 100 for FPGA based online 3D bin packing in accordance with some embodiments of the present disclosure.

In an embodiment, the system 100 includes a processor(s) 104, a field-programmable gate array (FPGA)110, communication interface device(s), alternatively referred as input/output (I/O) interface(s) 106, and one or more data storage devices or a memory 102 operatively coupled to the processor(s) 104. The system 100 with one or more hardware processors and the FPGA 110 is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The field-programmable gate array (FPGA) 110 is configured to fetch and execute computer-readable instructions stored in the memory 102. The FPGA 110 enables parallel execution of the computer-readable instructions stored in the memory 102.

Further a pipelined structure is leveraged on the FPGA 110 for FPGA based online 3D bin packing. A pipeline is an assembly line like architecture for a design that requires repetitive tasks wherein the same set of tasks are repeated multiple times with different inputs. In an example scenario for a set of 5 tasks (task 1-task 5), for an architecture without pipeline, a plurality of (i,j) positions, then a current position (i,j) must wait for the previous position (i,j) to be evaluated completely from Task 1 to Task 5 before the tasks are processed by Task 1. However, with task-level pipelining, each position (i,j) can be taken by Task 1 as soon as the previous position (i,j) has passed through Task 1 and the same applies for subsequent tasks (task 2-5). Hence a pipelined method maximizes the use of the resources for each task by never keeping them idle and increases the throughput of the process, hence evaluating more (i,j) positions within a given time. Furthermore, if each of these tasks require multiple independent operations on multiple data (such as an array), FPGA enables parallel processing by allowing access to all the data simultaneously as well as creating multiple instances of the required operators to process the above data simultaneously.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding online 3D binpacking. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
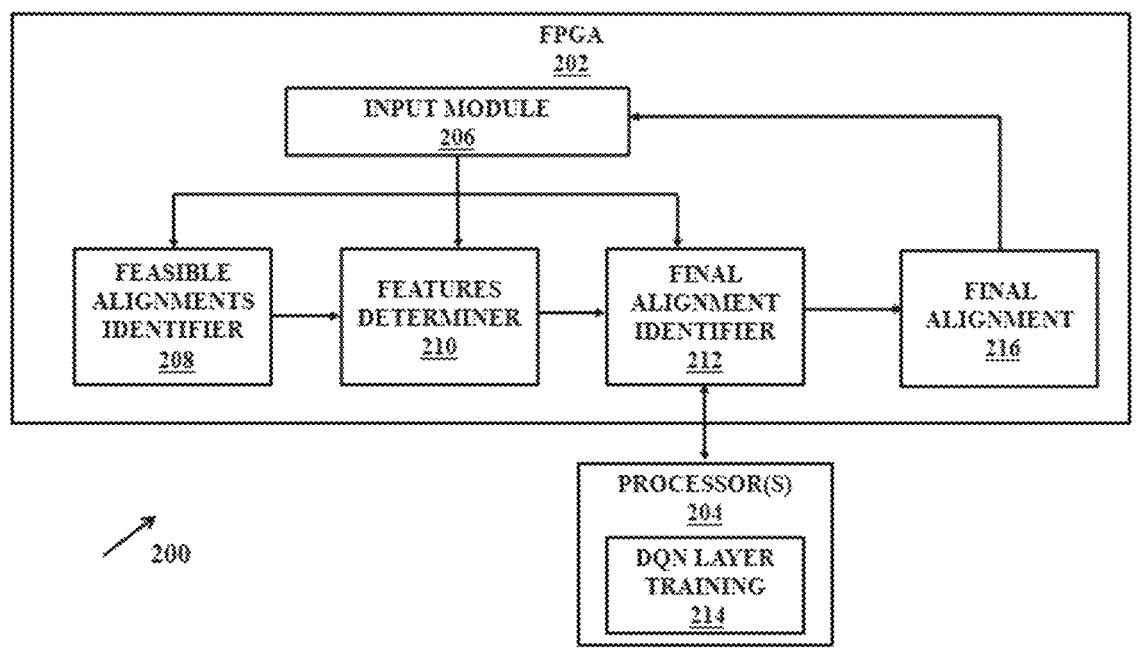
FIG. 2 is a block diagram depicting a functional overview of the system of FIG. 1 for FPGA based online 3D bin packing, according to some embodiments of the present disclosure.
Figure 3B:
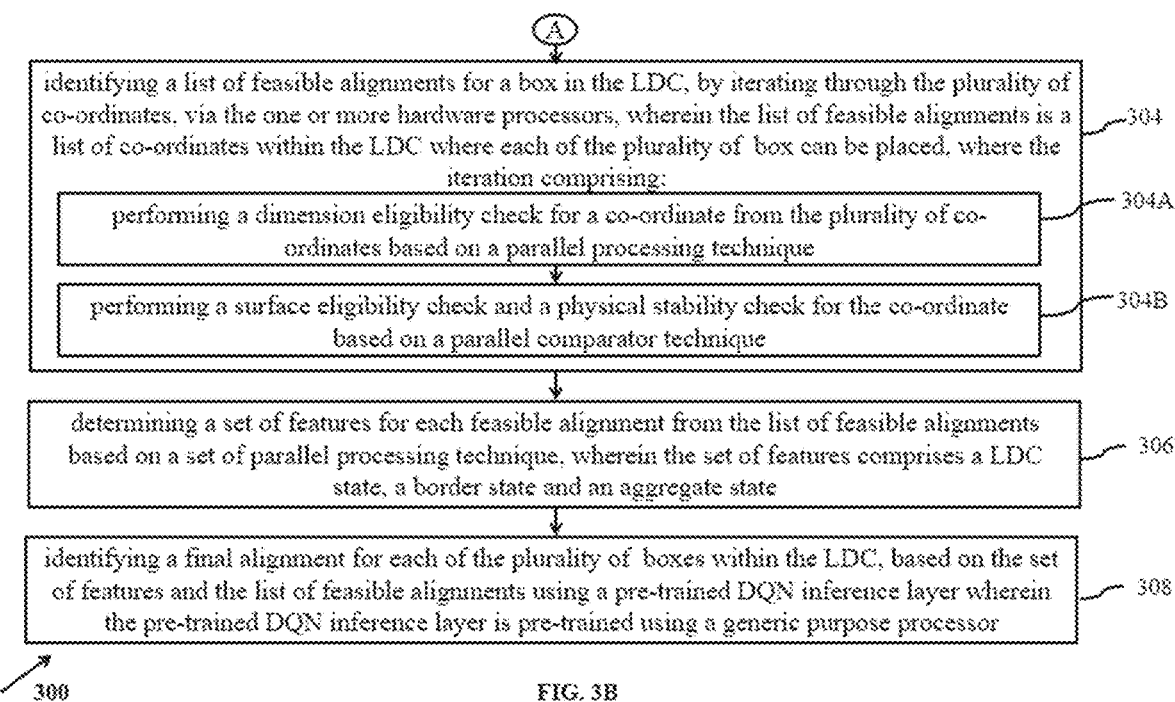
Figure 4:
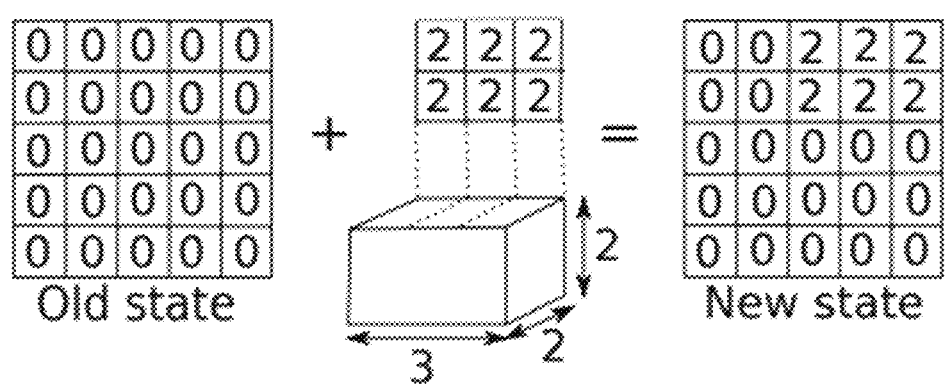
FIG. 4 illustrates an LDC box for 3D bin packing, according to some embodiments of the present disclosure.

Functions of the components of system 100 are explained in conjunction with functional overview of the system 100 in FIG. 2 and flow diagram of FIGS. 3A-3B.

FIG. 2 is an example block diagram of the various modules of the system of FIG. 1, in accordance with some embodiments of the present disclosure. As depicted in the architecture, the FIG. 2 illustrates the functions of the modules of the system 100 that includes FPGA based online 3D bin packing.

The system 200 is a hybrid architecture of FPGA 202 and processor (s) 204. The system 200 for FPGA based online 3D bin packing is configured to receive a plurality of inputs, using an input module 202. The system further includes a feasible alignments identifier 208 configured for identifying a list of feasible alignments for a box in the LDC, by iterating through the plurality of coordinates, wherein the list of feasible alignments is a list of coordinates within the LDC where the box can be placed. The system 200 further comprises a features determiner 210 configured for determining a set of features for each feasible alignment from the list of feasible alignments based on a set of parallel processing technique. The system 200 further comprises a final alignment identifier 212 configured for identifying a final alignment for the box within the LDC, based on the set of features and the list of feasible alignments using a pre-trained DQN inference layer wherein the pre-trained DQN inference layer is pre-trained using a DQN layer training 214 in the processor 202, wherein the processor 202 is a generic purpose processor. Further the final alignment of the box is updated in a final alignment 216, wherein the final alignment 216 is configured for updating the LDC by a height (h) of each box placed in the LDC based on the final alignment each of the boxes, till the plurality of boxes is packed within the LDC, the same is updated to the input module 202.

The various modules of the system 100 and the block in FIG. 2 are configured for FPGA based online 3D bin packing and are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIG. 3A and FIG. 3B. The FIG. 3A and FIG. 3B with reference to FIG. 1, is an exemplary flow diagram illustrating a method 300 for FPGA based online 3D bin packing using the system 100 of FIG. 1 according to an embodiment of the present disclosure.

The steps of the method of the present disclosure will now be explained with reference to the components of the system 100 for FPGA based online 3D bin packing and the modules 202-212 as depicted in FIG. 2 and the flow diagrams as depicted in the FIG. 3A and FIG. 3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a plurality of inputs is received in the input module 202. The receiving a plurality of inputs from a plurality of sources, wherein the plurality of inputs is associated with a plurality of boxes, and a Long-Distance Container (LDC) in which the plurality of boxes is to be packed, wherein the plurality of inputs comprises:

(a) a plurality of box dimensions for each box from the plurality of boxes, represented by a length (l), a breadth (b) and a height (h), (b) a plurality of coordinates within the LDC, and (c) a 2D-Array representation of the LDC where each element of the 2D array comprises a value equivalent to the height(h) of the plurality of boxes packed at a coordinate from the plurality of coordinates.

In an embodiment, the LDC represented by a length (L), a breadth (B) and a height (H). In an example scenario, the environment for online 3D bin packing is an LDC of dimensions: Length=80 cm, Breadth=45 cm and Height=45 cm. The state representation for bin packing depicts the top-down view of the LDC. It is hence defined as a rectangular grid (2D Array) of dimensions (80×45) where each cell increments its value by the height (h) of each box placed on it. An example scenario is illustrated using the FIG. 4, wherein a old state of the LDC is shown (represented with zero's) and a new state is shown after a box if height (h=2) is placed.

The box, which is a cuboid (represented by a length (l), a breadth (b) and a height (h)), is placed in the LDC in one at a certain coordinate from the plurality of coordinates on the grid implies placing the top-left corner of the box at that certain coordinate, wherein the plurality of coordinates consists of all the possible coordinates when the floor of the LDC is considered as a cartesian plane.

At step 304 of the method (300), a list of feasible alignments is identified for a box in the LDC in the feasible alignments identifier 208. The list of feasible alignments is a list of coordinates within the LDC where the box can be placed. The list of feasible alignments is identified by iterating through the plurality of coordinates, where the iteration comprises;

(a) Performing a dimension eligibility check for a coordinate from the plurality of coordinates based on a parallel processing technique; and
(b) Performing a surface eligibility check and a physical stability check for the coordinate based on a parallel comparator technique;

The step of identification of a list of feasible alignments consists of iterating through all the possible coordinates (the plurality of coordinates) in the LDC, wherein for an example scenario where a LDC with of dimensions: Length=80 cm, Breadth=45 cm and Height=45 cm, then the number of iterations would be: 45×80=3600. The list of feasible alignments is identified by iterating through the plurality of coordinates (3600 times) to shortlist the alignments which are feasible. Since the goal of the disclosed acceleration is to explore as many positions as possible, this step does only the bare minimum checks to ensure the box can physically be placed at a given coordinate. It contains of three checks (the dimension eligibility check, the surface eligibility check and the physical stability) that the coordinate has to pass through to qualify for the next step as explained in below sections.

The dimension eligibility check consists of comparison operations to check if the box, when placed at the particular coordinate, fits within the LDC. That is, the box once placed should not cross the boundaries of the 45×80 LDC grid (Length and Breadth Constraint check) and none of the cells within the box area should have a height>45 (Height Constraint Check). The dimension eligibility check for a coordinate from the plurality of coordinates based on a parallel processing technique. The parallel processing technique performs a length-breadth constraint check and a parallel comparison including a parallel height constraint check.

Figure 5:
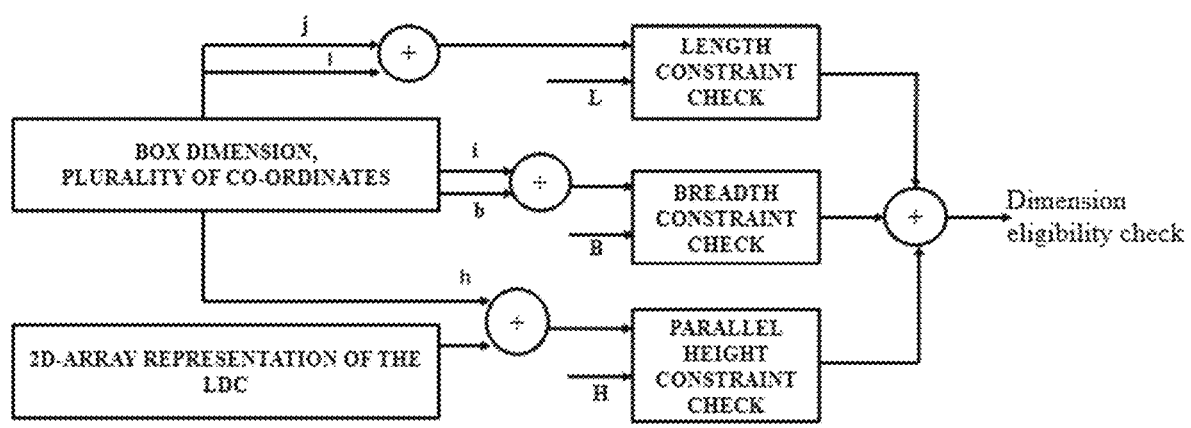
FIG. 5 illustrates performing a dimension eligibility check for 3D bin packing, according to some embodiments of the present disclosure.

The dimension eligibility check checks if the given box of dimensions (l,b,h) will physically fit at the given position (i,j) inside the LDC (L×B×H), wherein the length and breadth is evaluated using the length-breadth constraint check and the height is evaluated using the parallel comparison as shown in FIG. 5 and explained below:

Length: The length is evaluated using the length-breadth constraint check, wherein the box can fit into the LDC lengthwise if (j+l) does not exceed L, the length boundary of the LDC.

Breadth: The breadth is evaluated using the length-breadth constraint check, wherein the box can fit into the LDC breadthwise if (i+b) does not exceed B, the breadth boundary of the LDC.

Height: The height is evaluated using the parallel comparison, wherein the box can fit into the LDC height wise into the LDC if all the values in the area covered by the box (taken from the LDC 2D array), when incremented by the height of the box do not exceed H, the height boundary of LDC. Parallel comparators can be used on FPGA to access and compare all/multiple required values (from the LDC array) with H simultaneously instead of processing them sequentially in a traditional method.

The surface eligibility check and the physical stability check is performed based on the parallel comparator technique, that includes evaluating the coordinate on which the box of dimensions (l,b,h) is to be placed is:
(a) For surface eligibility check: Evaluates if the surface is smooth based on a pre-defined smoothness threshold parameter.
(b) For physical stability check: Evaluates if the surface is stable/topple-free based on a pre-defined stability threshold parameter to ensure that the box added does not topple.

Figure 6:
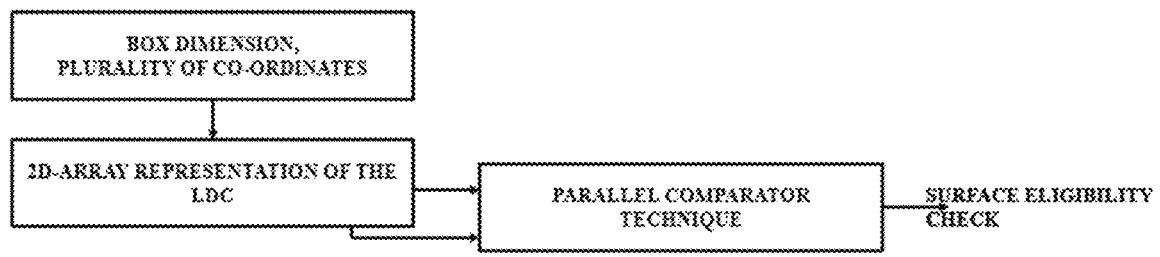
FIG. 6 illustrates surface eligibility check for 3D bin packing, according to some embodiments of the present disclosure.
Figure 7:
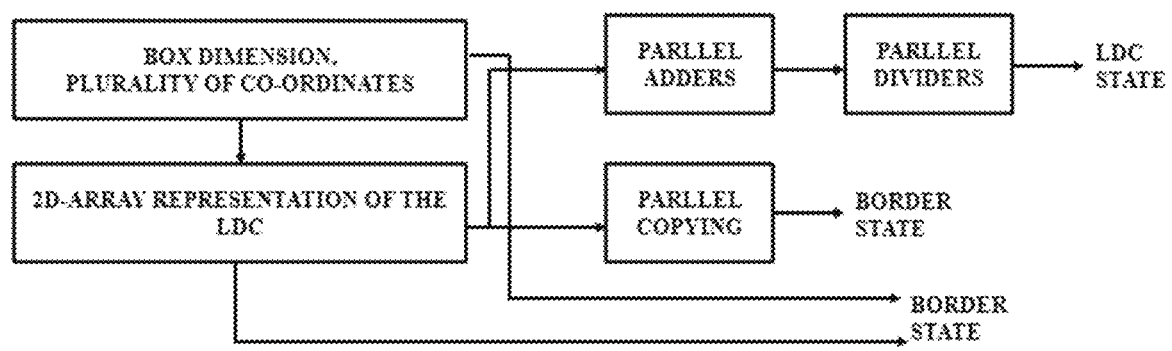
FIG. 7 illustrates determining a set of features for 3D bin packing, according to some embodiments of the present disclosure.

The surface eligibility check evaluates the stability of the surface on which the box might be placed if a particular coordinate is chosen. It consists of several conditional checks to ensure that the surface is completely smooth or at least has a tolerable unevenness as shown in FIG. 6.

The surface eligibility checks if the potential surface at (i,j) on which the box of dimensions (l,b,h) is to be placed is sufficiently smooth/stable. For a surface to be smooth, all the LDC array values on the surface [i to i+b,j to j+l] must be equal or almost equal (depending on the pre-defined smoothness threshold parameter allowed). Parallel comparators can be used on FPGA to access and compare all/multiple required values (from the LDC array) with each other simultaneously instead of processing them sequentially in a traditional method.

The physical stability check: Evaluates if the surface is stable/topple-free based on a pre-defined stability threshold parameter to ensure that the box added does not topple. Physical stability check consists of a set of validations, apart from surface eligibility, which contribute to the overall structural stability of the packed boxes. Uneven packing within the LDC, such as stacking a long column of boxes while the adjacent area is empty, might lead to the boxes toppling or getting displaced. Parallel comparators can be used on FPGA to compare the required adjacent values from the LDC Array and disqualify a coordinate if the difference is above the pre-defined stability threshold parameter.

At step 306 of the method (300), a set of features is determined for each feasible alignment from the list of feasible alignments in the features determiner 210. The set of features comprises a LDC state, a border state and an aggregate state. The set of features is determined based on a set of parallel processing technique. The step of set of features generates a set of 3 features for a given potential coordinate (i,j) and a given box (l,b,h), each of which represent different aspects of the state of the LDC if that particular coordinate is chosen. The set of parallel processing technique is illustrated using FIG. 7 and explained using flow chart in FIG. 8.

Figure 8:
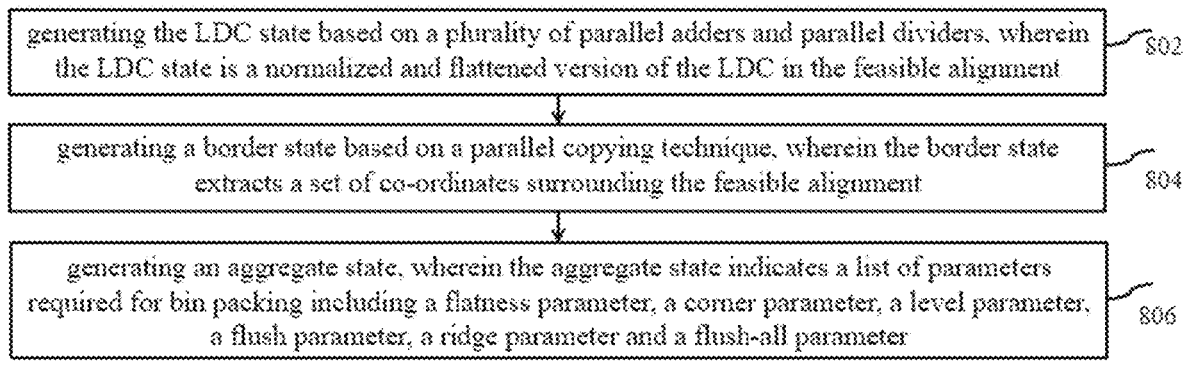
FIG. 8 is a flow diagram illustrating a method (400) for performing parallel processing technique, by the system of FIG. 1, in accordance with some embodiments of the present disclosure.

The set of parallel processing technique comprises of several steps and is explained using FIG. 8—an exemplary flow diagram illustrating a method 800 for set of parallel processing technique.

At step 802 of the method (800), the LDC state is generated based on a plurality of parallel adders and parallel dividers. The LDC state is a normalized and flattened version of the LDC array in a scenario where the feasibility alignment is chosen as the final alignment.

In an embodiment, LDC state is generated by creating a normalized and flattened copy of the 2D LDC array in the scenario that (i,j) is chosen to place the box. Parallel adders and dividers can be used on FPGA to access all/multiple values of the LDC array simultaneously, increment by h wherever necessary and normalise the array by dividing.

At step 804 of the method (800), the border state is generated based on a parallel copying technique. The border state extracts a set of coordinates surrounding the feasible alignment.

In an embodiment, the borders is extracted from the LDC array values by surrounding the box if (i,j) is chosen to place the box. The required rows/columns can be parallelly copied into the output simultaneously on FPGA. The extracted border determines how tight the box is packed relative to neighboring boxes. In an example scenario—an array consisting of all the LDC cell values (heights) along the perimeter of the box if placed at the (i,j). Maximum length=80+80+45+45+4=254. (Perimeter of the largest possible box).

At step 806 of the method (800), the aggregate state is generated. The aggregate state indicates a list of parameters required for bin packing. The aggregate state includes a flatness parameter, a corner parameter, a level parameter, a flush parameter, a ridge parameter and a flush-all parameter.

In an embodiment, an array (Length=9) consisting of a few parameters essential to efficient packing:
  (a) Flatness parameter: A flag to indicate if the surface, on which the box is to be placed, is totally smooth.
  (b) Corner parameter: A flag to indicate if (i, j) is a corner (either of any of the packed boxes or of the LDC itself).
  (c) Level parameter: The current height of the surface on which the box is to placed.
  (d) to (f) Flush parameter: Parameters to indicate the relative height of each of the four borders of box once it is placed.
  (e) Ridge parameter: Mean of the absolute difference between the border heights (Feature 2) and the projected height of the surface on which the box is placed. (Level+height of box).
  (f) FlushAll parameter: Sum of the flush parameter and the ridge parameter to indicate the stability of the new resulting surface if the box is placed at this coordinate.

At step 308 of the method (300), a final alignment for the box is identified within the LDC in the final alignment identifier 212. The final alignment for the box is identified based on the set of features and the list of feasible alignments using a pre-trained DQN inference layer. The pre-trained DQN inference layer is pre-trained using a DQN layer training 214 in the processor 202, wherein the processor 202 is a generic purpose processor.

The identification of the final alignment for the box comprises:
  (a) determining a Q-value for each feasible alignment, and
  (b) identifying the final alignment based on comparison of the Q-value of each feasible alignment, wherein the feasible alignment with the maximum Q-value is identified as the final alignment.

DQN architecture consists of 7 dense layers. Each dense layer involves a matrix multiplication with a fixed pre-loaded Weight matrix followed by addition with a fixed pre-loaded Bias vector. This is followed by applying the Tanh activation function before the output is passed on to the next layer. The final layer generates a single Q-Value as its output. The vector-matrix multiplication involved in each dense layer involves multiplication of individual elements of the vector with each column of the matrix and addition of these products generated by each column to get the resulting element of the output.

On FPGA, this process can be sped up by making use of parallel multipliers to perform multiple element multiplications simultaneously followed by adder trees which continuously add consecutive products in pairs without accumulating each product parallelly.

The final alignment is identified by comparing the incoming Q value with the maximum Q value so far and replaces the same if it is greater. The corresponding (i,j) position and orientation is also updated. The output of this task in the final iteration, after all (i,j) positions are evaluated, is the final (i,j) chosen by the algorithm to place the box With reference to the training of the DQN layer—a generic purpose processor is utilized for training the DQN layer includes one of a Central Processing Unit (CPU), a Graphical Processing Unit (GPU). The training process involves continuous packing of boxes with the DQN parameters being updated after every few boxes. In addition to the bin packing algorithm, where only the updated LDC state is given as an output of the design, the input features and corresponding Q-value of each selected position must be saved and passed to an external processor which trains the DQN model and updates the weight and bias matrix/vector for each of the 7 dense layers in the DQN. These updated parameters must be copied regularly to the FPGA and used in the DQN inference block.

Further the final alignment of the box is updated in a final alignment 216, wherein the final alignment 216 is configured for updating the LDC by a height (h) of each box placed in the LDC based on the final alignment each of the boxes, till the plurality of boxes is packed within the LDC, the same is updated to the input module 202.

Experiments

Experimental Setup and methodology: For experimentation purposes—Alveo U280 Data Center Accelerator Card, mounted on a 56 core CPU with hyper threading and 256 GB memory was used to deploy the accelerated bin packing kernel. The Xilinx Vitis accelerated flow provided the necessary drivers to establish communication with the U280 and host side code was written in C++ using OpenCL libraries to communicate with the kernels. The HBM memory on U280 was used to transfer the inputs and outputs to and from the FPGA kernel. The final running frequency of the kernel was 140 MHz. The original Python algorithm was also run on the same CPU for efficient comparison.

Bin Packing speed up achieved on FPGA: To enable accurate latency comparison, both FPGA and CPU bin packing implementations were used to pack the set of 256 boxes (with randomly generated dimensions), out of which 60 boxes were successfully packed by both solutions. Table 1 summarizes the timing results where latency/box represents the time taken to pack each box. On U280, the accelerated bin packing design has a resource consumption of 42% LUTs and 60% DSPs along with a 22% BRAM usage.

TABLE 1

Timing results where latency/box represents the time taken to pack each box

| Latency/Box | CPU (ms) | FPGA (ms) | Speed Up |
| --- | --- | --- | --- |
| Minimum | 64.25 | 9.1 | 7× |
| Average | 700.8 | 29.6 | 23× |
| Maximum | 5674 | 145.6 | 38× |

Figure 9:
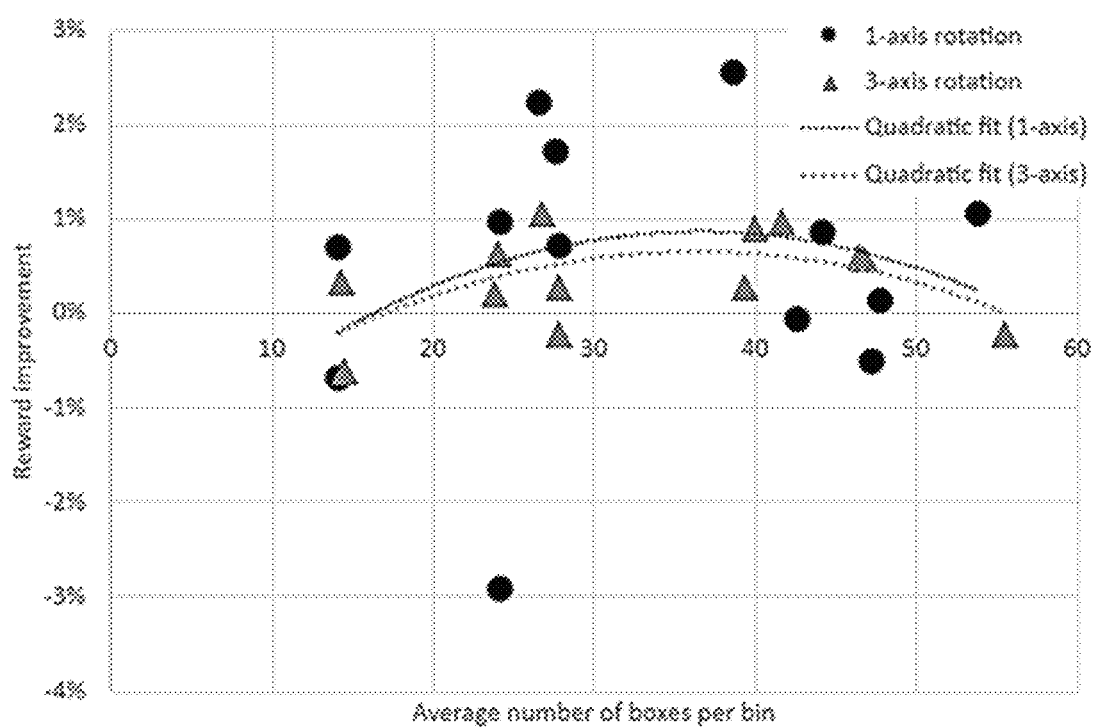
FIG. 9 illustrates experimental results for 3D bin packing, according to some embodiments of the present disclosure.

Effect of expanded search space on rewards: The core hypothesis of the disclosed techniques is that the implementation of RL on FPGA allows us to expand the search space from an artificially limited one (corner positions only, for the current 3D bin packing scenario) to a potentially much larger one. FIG. 9 substantiates this claim by comparing the rewards achieved by the corner-position search with those achieved by an all-position search. Hence results are plotted on 3 real world data sets and 10 synthetically generated ones, with a mix of box sizes ranging from small to large. It is observed that when box sizes are uniformly large (low number of average boxes per bin in FIG. 9 or uniformly small (high number of boxes per bin), the improvement in rewards is not significant. This is intuitive, because in such cases the best packing efficiency is achieved by a uniform arrangement of boxes. However, in data sets with a mix of small and large boxes (between 20 and 50 boxes per bin), searching through all positions gives a significant advantage.

The unique advantage of the disclosed method includes leveraging the parallel execution-pipeline architecture of FPGA to exhaustively evaluate multiple alignments by processing different smaller tasks instead of waiting for a single alignment to be evaluated completely. Further the Deep RL is trained using a generic purpose processor and the inference is performed in the FPGA to make the disclosure computationally light, faster and efficient.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein provide a FPGA based online 3D bin packing. The 3D bin packing is a process of packing boxes or parcels into larger bins (called Long Distance Containers or LDCs) such that the space inside each LDC is used to the maximum extent. In recent years, the use of deep reinforcement learning (Deep RL) for solving online 3D Bin Packing is gaining popularity, however training for deep RL involves heavy iterative computation and since the existing processor-based implementations are limited by Von Neumann architecture, thus resulting in inability to explore all possible alignments. The disclosure leverages the parallel execution-pipeline architecture of FPGA to exhaustively evaluate multiple alignments by processing different smaller tasks instead of waiting for a single alignment to be evaluated completely. Further the Deep RL is trained using a generic purpose processor and the inference is performed in the FPGA to make the disclosure computationally light, faster and efficient.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A pipe-lined Field Programmable Gate Array (FPGA) implemented method, comprising:
   receiving a plurality of inputs from a plurality of sources, wherein the plurality of inputs is associated with a plurality of boxes, and a Long-Distance Container (LDC) in which the plurality of boxes is to be packed, wherein the plurality of inputs comprises:
   a plurality of box dimensions for each box from the plurality of boxes, represented by a length (l), a breadth (b) and a height (h);
   a plurality of coordinates within the LDC; and
   a 2D-Array representation of the LDC where each element of the 2D array comprises a value equivalent to the height (h) of the plurality of boxes packed at a coordinate from the plurality of coordinates;

identifying a list of feasible alignments for each of the boxes from the plurality of boxes, in the LDC, by iterating through the plurality of coordinates, via the one or more hardware processors, wherein the list of feasible alignments is a list of coordinates within the LDC where each of the box can be placed, where the iteration comprising:

performing a dimension eligibility check for a coordinate from the plurality of coordinates based on a parallel processing technique; and performing a surface eligibility check and a physical stability check for the coordinate based on a parallel comparator technique;

determining a set of features for each feasible alignment from the list of feasible alignments, via the one or more hardware processors, based on a set of parallel processing technique, wherein the set of features comprises a LDC state, a border state, and an aggregate state; and identifying a final alignment for the box within the LDC, based on the set of features and the list of feasible alignments, via the one or more hardware processors, using a pre-trained DQN inference layer wherein the pre-trained DQN inference layer is pre-trained using a generic purpose processor.

2. The FPGA implemented method of claim 1, wherein the 2D-Array representation of the LDC is updated by the height (h) of each box placed in the LDC based on the final alignment of each of the plurality of boxes, till the plurality of boxes is packed within the LDC.

3. The FPGA implemented method of claim 1, wherein the parallel processing technique performs a length-breadth constraint check and a parallel comparison including a parallel height constraint check.

4. The FPGA implemented method of claim 1, wherein the parallel comparator technique includes evaluating the coordinate on which each of the box of dimensions (l,b,h) is to be placed is (a) smooth based on a pre-defined smoothness threshold parameter, (b) stable or topple-free based on a pre-defined stability threshold parameter to ensure that the box added does not topple.

5. The FPGA implemented method of claim 1, wherein the set of parallel processing technique comprises:

generating the LDC state based on a plurality of parallel adders and parallel dividers, wherein the LDC state is a normalized and flattened version of the LDC in the feasible alignment;

generating the border state based on a parallel copying technique, wherein the border state extracts a set of coordinates surrounding the feasible alignment; and generating the aggregate state, wherein the aggregate state indicates a list of parameters required for bin packing including a flatness parameter, a corner parameter, a level parameter, a flush parameter, a ridge parameter and a flush-all parameter.

6. The FPGA implemented method of claim 1, wherein the generic purpose processor includes one of a Central Processing Unit (CPU), and a Graphical Processing Unit (GPU).

7. The FPGA implemented method of claim 1, wherein the identification of the final alignment for the box comprises (a) determining a Q-value for each feasible alignment, and (b) identifying the final alignment based on comparison of the Q-value of each feasible alignment, wherein the feasible alignment with the maximum Q-value is identified as the final alignment.

8. A pipe-lined Field Programmable Gate Array (FPGA) implemented system, configured by the instructions to:

receive a plurality of inputs from a plurality of sources, wherein the plurality of inputs is associated with a plurality of boxes, and a Long-Distance Container (LDC) in which the plurality of boxes is to be packed, wherein the plurality of inputs comprises:

a plurality of box dimensions for each box from the plurality of boxes, represented by a length (I), a breadth (b) and a height (h);

a plurality of coordinates within the LDC; and a 2D-Array representation of the LDC where each element of the 2D array comprises a value equivalent to the height (h) of the plurality of boxes packed at a coordinate from the plurality of coordinates;

identify a list of feasible alignments for each of the plurality of boxes from the plurality of boxes, in the LDC, by iterating through the plurality of coordinates, via the one or more hardware processors, wherein the list of feasible alignments is a list of coordinates within the LDC where the box can be placed, where the iteration comprising:

performing a dimension eligibility check for a coordinate from the plurality of coordinates based on a parallel processing technique; and performing a surface eligibility check and a physical stability check for the coordinate based on a parallel comparator technique;

determine a set of features for each feasible alignment from the list of feasible alignments, via the one or more hardware processors, based on a set of parallel processing technique, wherein the set of features comprises a LDC state, a border state, and an aggregate state; and identify a final alignment for each of the plurality of boxes within the LDC, based on the set of features and the list of feasible alignments, via the one or more hardware processors, using a pre-trained DQN inference layer wherein the pre-trained DQN inference layer is pre-trained using a generic purpose processor.

9. The FPGA implemented system of claim 8, wherein the 2D-Array representation of the LDC is updated by the height (h) of each box placed in the LDC based on the final alignment each of the plurality of boxes, till the plurality of boxes is packed within the LDC.

10. The FPGA implemented system of claim 8, wherein the parallel processing technique performs a length-breadth constraint check and a parallel comparison including a parallel height constraint check.

11. The FPGA implemented system of claim 8, wherein the parallel comparator technique includes evaluating the coordinate on which the box of dimensions (l,b,h) is to be placed is (a) smooth based on a pre-defined smoothness threshold parameter, (b) stable or topple-free based on a pre-defined stability threshold parameter to ensure that the box added does not topple.

12. The FPGA implemented system of claim 8, wherein the set of parallel processing technique comprises:

generating the LDC state based on a plurality of parallel adders and parallel dividers, wherein the LDC state is a normalized and flattened version of the LDC in the feasible alignment;

generating the border state based on a parallel copying
technique, wherein the border state extracts a set of
coordinates surrounding the feasible alignment; and
generating the aggregate state, wherein the aggregate state
indicates a list of parameters required for bin packing
including a flatness parameter, a corner parameter, a
level parameter, a flush parameter, a ridge parameter
and a flush-all parameter.

13. The FPGA implemented system of claim 8, the generic purpose processor includes one of a Central Processing Unit (CPU), a Graphical Processing Unit (GPU).

14. The FPGA implemented system of claim 8, the identification of the final alignment for the box comprises (a) determining a Q-value for each feasible alignment and (b) identifying the final alignment based on comparison of the Q-value of each feasible alignment, wherein the feasible alignment with the maximum Q-value is identified as the final alignment.

15. One or more non-transitory machine readable information storage mediums comprising one or more instructions which when executed by one or more hardware processors cause:

receiving a plurality of inputs from a plurality of sources, wherein the plurality of inputs is associated with a plurality of boxes, and a Long-Distance Container (LDC) in which the plurality of boxes is to be packed, wherein the plurality of inputs comprises:
a plurality of box dimensions for each box from the plurality of boxes, represented by a length (l), a breadth (b) and a height (h);
a plurality of coordinates within the LDC; and
a 2D-Array representation of the LDC where each element of the 2D array comprises a value equivalent to the height (h) of the plurality of boxes packed at a coordinate from the plurality of coordinates;

identifying a list of feasible alignments for each of the plurality of boxes from the plurality of boxes, in the LDC, by iterating through the plurality of coordinates, via the one or more hardware processors, wherein the list of feasible alignments is a list of coordinates within the LDC where the box can be placed, where the iteration comprising:
performing a dimension eligibility check for a coordinate from the plurality of coordinates based on a parallel processing technique; and
performing a surface eligibility check and a physical stability check for the coordinate based on a parallel comparator technique;

determining a set of features for each feasible alignment from the list of feasible alignments, via the one or more hardware processors, based on a set of parallel processing technique, wherein the set of features comprises a LDC state, a border state, and an aggregate state, and identifying a final alignment for each of the plurality of boxes within the LDC, based on the set of features and the list of feasible alignments, via the one or more hardware processors, using a pre-trained DQN inference layer wherein the pre-trained DQN inference layer is pre-trained using a generic purpose processor.

* * * * *